(12) United States Patent
Abbasi

(10) Patent No.: US 8,322,742 B2
(45) Date of Patent: Dec. 4, 2012

(54) HUMAN POWERED VEHICLE WITH SINGLE LEVER FOR FOLDING AND BREAKING

(76) Inventor: Abdul Latif Abbasi, Toronto (CA)

( * ) Notice: Subject to any disclaimer, the term of this patent is extended or adjusted under 35 U.S.C. 154(b) by 515 days.

(21) Appl. No.: 12/577,170

(22) Filed: Oct. 10, 2009

(65) Prior Publication Data
US 2011/0084460 A1   Apr. 14, 2011

(51) Int. Cl.
*B62M 1/08* (2006.01)
(52) U.S. Cl. .................. 280/251; 280/264; 280/278
(58) Field of Classification Search .... 280/87.01–87.05, 280/221, 223, 264, 251, 256, 278; 192/50, 192/41 R, 44
See application file for complete search history.

(56) References Cited

U.S. PATENT DOCUMENTS

| | | | | |
|---|---|---|---|---|
| 2,185,698 | A * | 1/1940 | Wright | 280/251 |
| 3,656,777 | A * | 4/1972 | Keiser, Jr. | 280/87.043 |
| 3,760,914 | A | 9/1973 | Gelbrich | |
| 4,746,135 | A | 5/1988 | Oh | |
| 5,496,051 | A * | 3/1996 | Farmos | 280/252 |
| 6,270,102 | B1 | 8/2001 | Fan | |
| 6,276,701 | B1 | 8/2001 | Chen | |
| 6,443,470 | B1 | 9/2002 | Ulrich et al. | |
| 6,462,493 | B2 * | 10/2002 | Lan | 318/272 |
| 6,520,525 | B1 * | 2/2003 | Yoon | 280/278 |
| 6,648,355 | B2 * | 11/2003 | Ridenhour | 280/255 |
| 6,764,088 | B2 | 7/2004 | Hung | |
| 7,497,453 | B2 * | 3/2009 | Fan | 280/252 |
| 2010/0117327 | A1 * | 5/2010 | Hadley | 280/214 |
| 2010/0327551 | A1 * | 12/2010 | Liu et al. | 280/251 |

OTHER PUBLICATIONS

U.S. Appl. No. 10/010,094, filed May 8, 2003, Christopher V. Martin.

* cited by examiner

*Primary Examiner* — Katy M Ebner
*Assistant Examiner* — Emma K Frick
(74) *Attorney, Agent, or Firm* — Nasser Ashgriz

(57) ABSTRACT

A human powered vehicle having a mechanism to run the vehicle by applying the operator's weight on at least one pedal in a reciprocating manner. The pedal moves a cranking body, which unwinds a drum. The drum is attached to at least one wheel by a directional freewheel clutch. The vehicle can also be simultaneously powered by a motor, whereas the motor takes over only when the vehicle reaches a certain speed, and automatically disengages when the vehicle slows down below a certain speed. Both the human powered and motor mechanism can operate independently without rotating any part of the other.

14 Claims, 19 Drawing Sheets

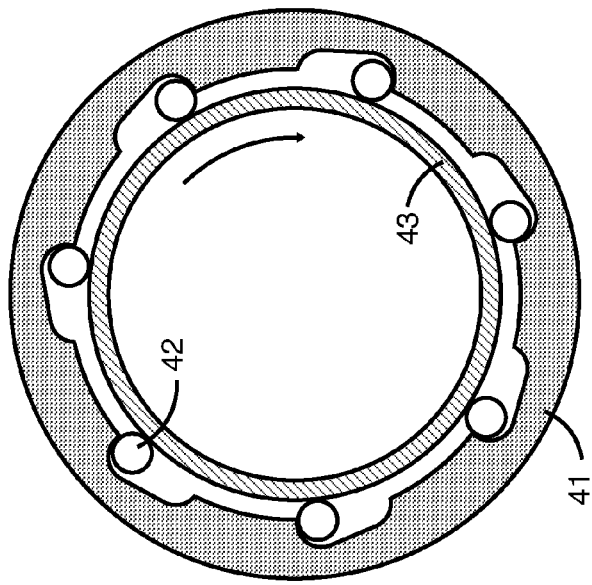
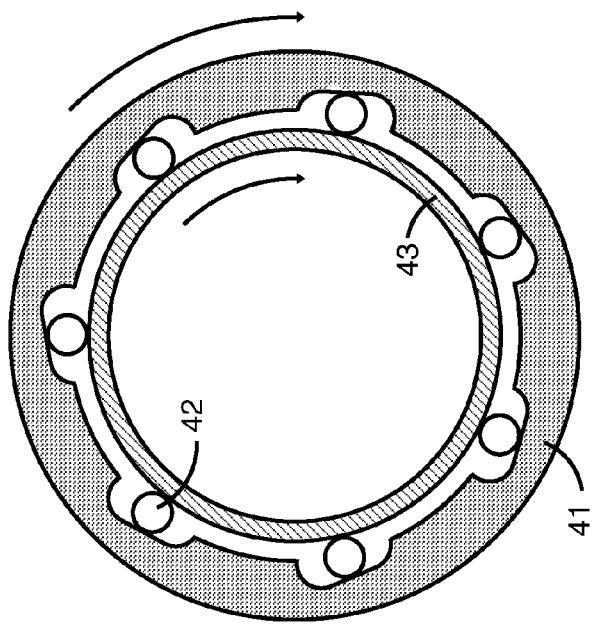
FIG 14

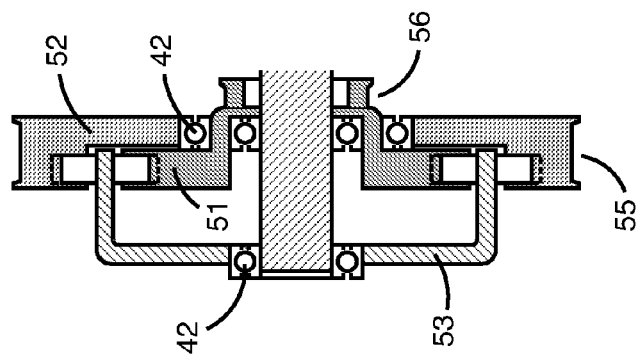
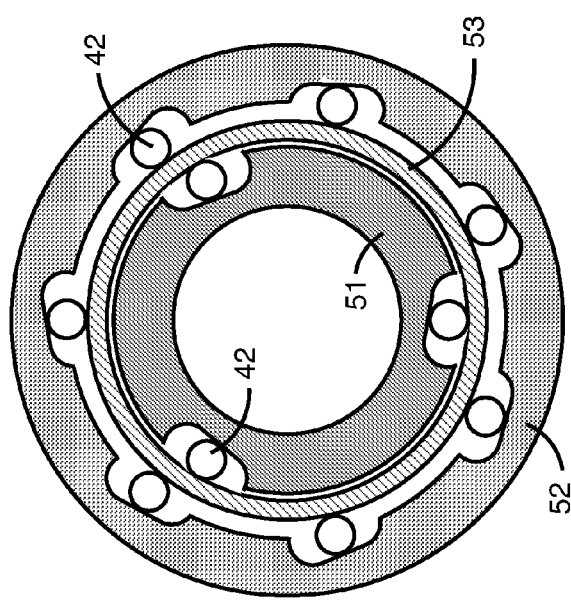
FIG 15

HUMAN POWERED VEHICLE WITH SINGLE LEVER FOR FOLDING AND BREAKING

FIELD OF THE INVENTION

The present invention relates to a human powered mechanism that can be operated by applying force to one or more pedals together or severally. It includes a freewheel clutch for driving the vehicle, with the possibility of motor assistance. A single pedal is used to apply the brakes and also, to releases latched to fold the vehicle.

DESCRIPTION OF THE RELATED ART

There are variety of small vehicles, which either human powered, or motorizes, or both. U.S. Pat. No. 6,462,493 describes a driving control apparatus of motorized scooter. This scooter comprises of a power switch, speed control circuit and at least one relay. When the power switch and speed control circuit are on, and the relay is open, user may push the wheels of the scooter manually to drive the motor; when a set speed is reached and the relay is closed, the motor is driven directly, controlling the speed of the scooter. U.S. Pat. No. 6,764,088 discloses an invention which may broadly be said to consist of a drive mechanism for a vehicle having at least one front and one rear wheel. The invention comprises of a pair of rotatable crank arms with each of them being attached to a footboard. Downward pressure on each footboard drives rotation of the crank arms which in turn drive a wheel of the vehicle.

U.S. patent with application Ser. No. 10/010,094 describes an improved motorized folding portable footboard scooter. The rider of the scooter stands upon a scooter platform and directs the scooter. In addition, this scooter has a varying transmission. The resulting portable motorized foot scooter has greater speed over a non-transmission scooter while still retaining its lightweight portability. U.S. Pat. No. 6,270,102 discloses an invention which describes a scooter having a rider-operated mechanism for driving the scooter in forward motion, and includes the use of an endless chain loop for transferring propulsion to one wheel of the scooter.

Most small vehicle of this sort, need to be foldable for easy storage and transportation. For instance, there are many different types of foldable scooters. For instance, U.S. Pat. No. 6,276,701 discloses a folding mechanism for scooter. The primary objective of this invention is to provide a scooter including a safety and solid folding mechanism for solidly retaining the scooter in the open or working position and for preventing the scooter from being folded to the compact folding structure inadvertently. U.S. Pat. No. 6,443,470 discloses a foldable scooter. This scooter comprises of a plurality of wheels, a steerer, a platform, and a steerer support. The steerer support connects the steerer to the platform. The steerer support can rotate with respect to the platform, allowing the scooter to be folded when not in use. The invention allows the steerer support to nest within the platform, further allowing the scooter to collapse into a compact position.

Despite the existence of prior art with similar functionality to the current invention, the essential elements of the present invention are not disclosed in any of them. Consequently, the present invention is unique for its specific features.

SUMMARY OF THE INVENTION

The present invention is a foldable human powered vehicle, having a freewheel clutch, which allows for both a human powered cranking mechanism, as well as a motor drive for driving the vehicle. It also uses a single pedal for braking and folding.

Pulling the brake pedal upwards will unlock a latch allowing the vehicle to fold into its collapsed state. A similar procedure allows for unlocking of latches to transform from the collapsed state back to the upright expanded state. Pressing of the brake pedal results in a contact between the brake pads and the wheel drum slowing the vehicle down. At least one other pedal is connected to a cranking body, which once rotated will unwind a spring loaded drum causing the clutch to engage and transmit power to at least one wheel.

The prior art foldable scooters do not have the convenience of using a single pedal to achieve the two primary functions, namely folding and braking. Therefore, it is an object of the present invention to use one pedal, minimizing operational complexity of the vehicle.

It is also a further object of the present invention to utilize an efficient yet simple human powered mechanism for the motion of the foldable scooter that does not require constant maintenance. The mechanism is simple involving only a few mechanical components, thus eliminating the possibility of extensive maintenance.

The present scooter primarily uses a human powered mechanism for its driving motion. It has drive pedals, which are completely independent of each other, each unwinding a spiral shaped drum, which in turn drives the wheel. The spiral is designed such that it has a larger unwinding radius at the start of the cranking stroke, thus providing greater torque in the beginning of the stroke. The radius gradually decreases as the cranking force gains momentum, allowing for greater speed at the end of the stroke.

The mechanism also gives the rider freedom to use one or both the pedals at will. A free-wheeling mechanism is included, allowing uninterrupted motion of the vehicle when pedaling is stopped. However for safety this mechanism does not allow the vehicle to roll back thus ensuring balance and confidence for the rider. On an incline the vehicle will roll forward without the pedal assistance but will not roll backward on a reverse incline.

It is a further object of the present invention to use the assistance of a motor to power at least one wheel once the vehicle has reached a certain speed. The design allows the installation of the electric assist motor without hindering the use of pedals. The rider may first pedal and achieve a certain speed when the electric assist motor will automatically cut in and takeover the drive. When the rider applies brakes and the vehicle slows down the electric assist motor will automatically cut out. This ensures that the rider does not need to flip or operate and switches in order for the electric assist motor to cut in or cut out.

These and other objects of the present invention will become readily apparent upon further review of the following specification and drawings. To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the figures, which illustrate, by way of example only, embodiments of the present invention.

FIG. 14 illustrates the (a) clutched and (b) de clutched modes of the free clutch mechanism, where the driver wheel 41 drives the driven wheel 43 from outside, while allowing freewheeling of the drum;

FIG. 15 illustrates (a) front and (b) side views of a free wheel clutch having both and internal driver and an external driver sandwiching a driven drum 53;

DETAILED DESCRIPTION OF THE INVENTION

Figure 1:
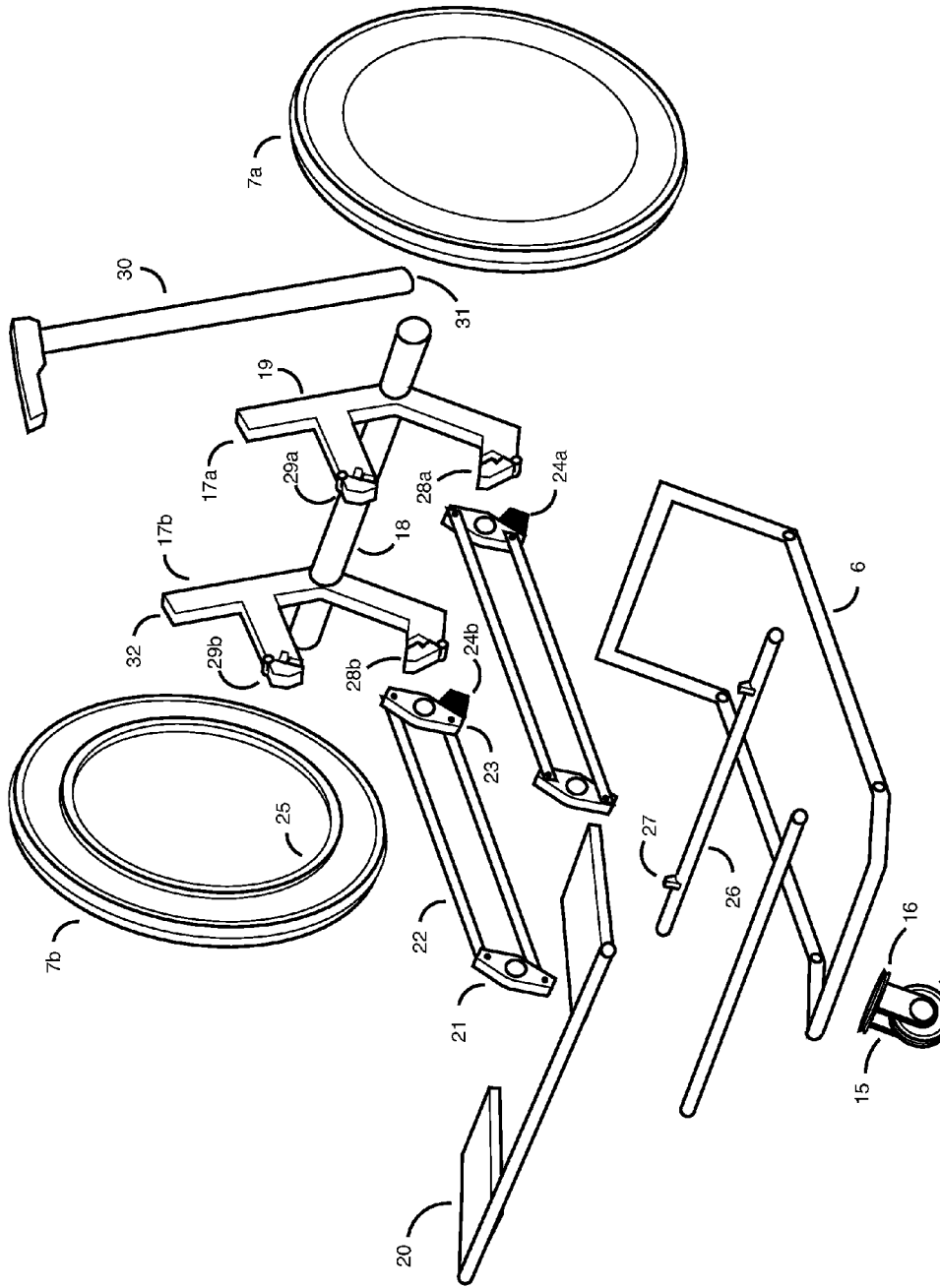
FIG. 1 is an isometric illustration of the present invention.

The present invention is powered scooter or similar vehicle with a single lever for braking and folding. As FIG. 1 shows one embodiment of the present invention comprising of a main chassis 6, which acts as the scooter platform. This embodiment of the invention has two powered wheels 7a and 7b, which are connected to the scooter by a cylindrical rod 18. The rod 18 acts as a dead axle and connects the latching arms 17a and 17b, forming a solid latching chassis 19. This embodiment of the present invention has one steerable front wheel 14. The steerable wheel 14 is connected to the front end of the main chassis 6, via a pivoted bracket 15 that may include a drum 16 that winds or unwinds cables in either direction to allow the vehicle to be steered. The opposite end of the cables are attached to the steering column 30 such that if either one of the cables is pulled, the column is rotated in one direction or the other. Although this embodiment shows the scooter with one front and two rear wheels, it can have any number of front/rear wheels. Moreover, the front/rear wheel could connect to the front/rear end of the chassis, respectively, by any connection means that allow the wheels to rotate freely.

Figure 2:
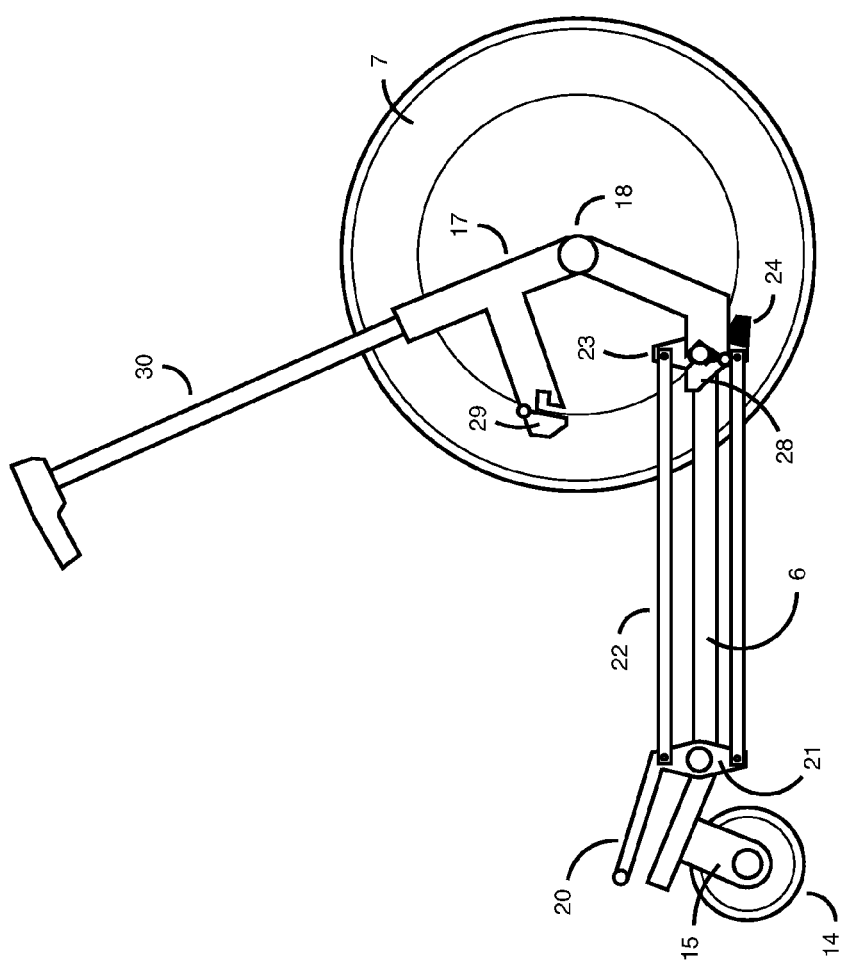
FIG. 2 is the exploded illustration of the present invention.
Figure 3:
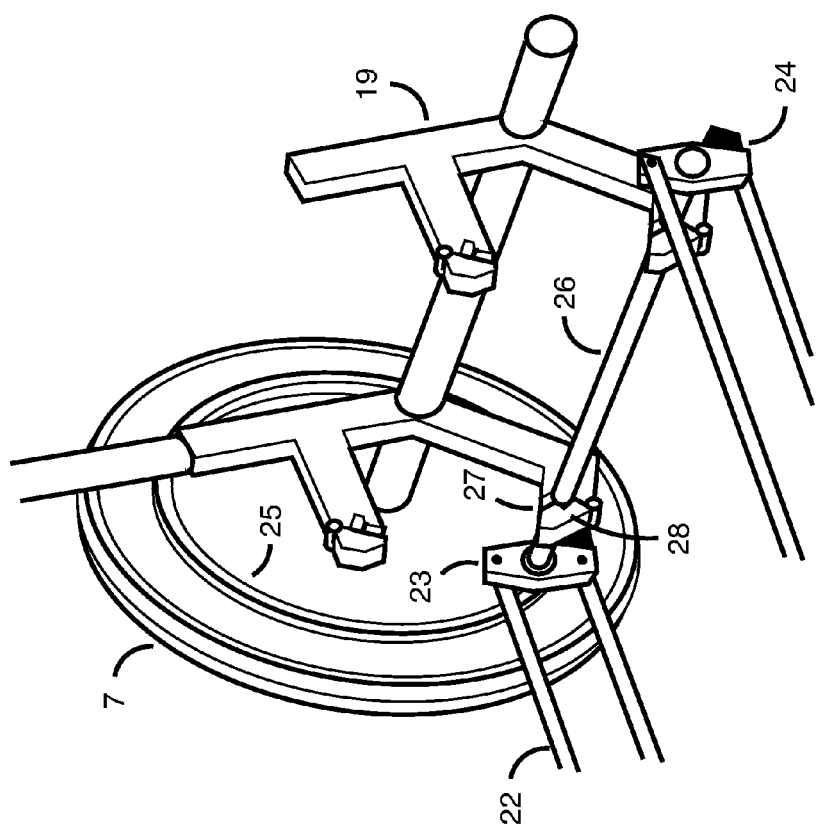
FIG. 3 is a side view illustration of the present vehicle with one of the rear wheels removed and showing the lever in its normal position.
Figure 4:
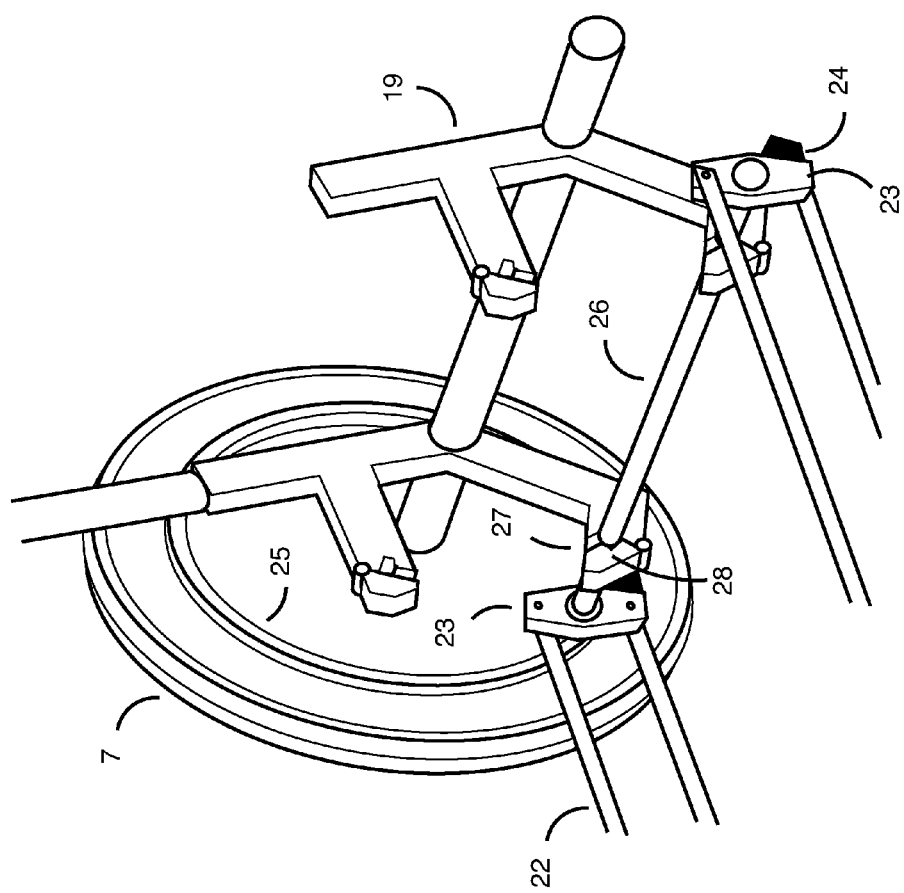
FIG. 4 is an isometric close-up illustration of the current invention showing the position of braking pads and latches.

FIGS. 2 and 3 show the scooter when all of the components are connected together. The present scooter further comprises of one or two columns 30, which are connected to either one or both of the latching arms 17a or 17b via pivoted joints 31. The column, latching arms and the axle 18, form the foldable part of the scooter. Each latch arm, consists of two latches 28 and 29.

FIG. 1 illustrates the braking and folding system comprising of lever 20 which is connected to at least one mechanically operated rocker arm 21. The present embodiment shows two rockers located on left and right side of the main chassis. The two rockers 21 are then connected to two other rocker arms 23 via one or more connecting rods 22 to each set. Any other means for connecting can be used. The rod can be connected to the actuator arms by any possible attachment that allows the rod to rotate around its attachment by a defined degree of freedom. The rocker arms 23 are connected to, and rotate a braking and latching axle 26, which is connected to the main chassis 6. In this embodiment, 28a and 28b are two latches, which will hold the vehicle in its expanded position by latching onto the latching axle 26 (see FIG. 2). Two other latched, 29a and 29b (see FIG. 1) hold the vehicle in fold position. The latching axle 26 includes two cams 27 that, when rotated in the correct direction, can unlatch the latches 28 and 29.

The column 30 of the scooter is connected to the foldable part of scooter's chassis 19 via a pivoted joint such that the column can be rotated around its axis. The rotation of the column causes one of two attached cables to be pulled. The opposite ends of the cables are attached to the steerable wheel such that the scooter can be steered by rotating the column 30.

As the FIG. 3 shows, there are brake pads 24, which are connected to the rocker arms 23. The brake pads may be connected to any part of the braking and latching axle 26 such that when the axle is rotated in one direction, the pads 24 are pushed against a braking drum or the wheels 7. This illustration also shows that the latching axle, is held by the latches 28a and 28b (see FIG. 1), firmly connecting the latching chassis 19 to the main chassis 6.

Figure 5:
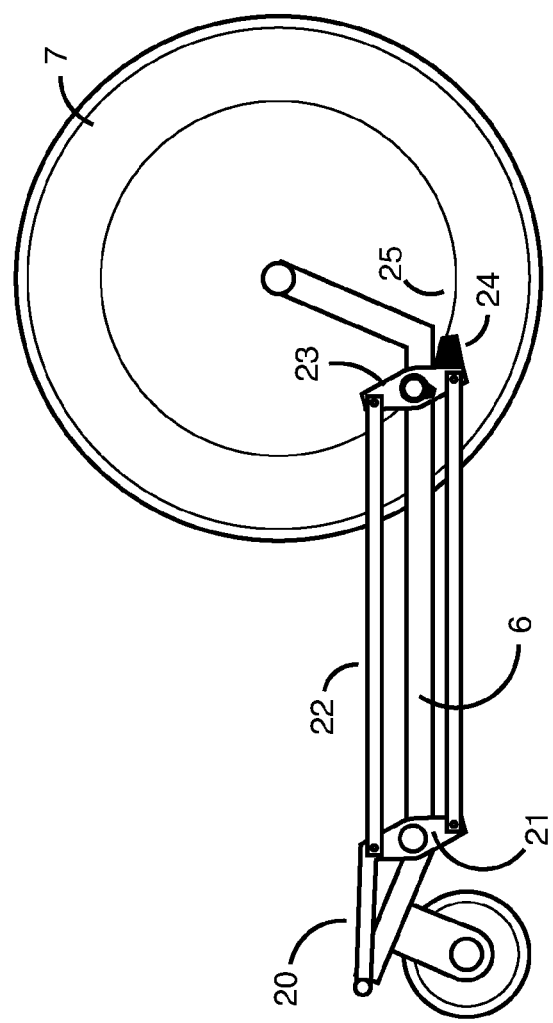
FIG. 5 is a side view illustration of the present invention with one of the rear wheels removed and when the lever is in brake position—latching chassis is not shown for clarity.

FIG. 5 shows the vehicle in brake position. As illustrated in this sketch, the brake pedal 20 is pushed downwards. Consequently, the rocker arm 21, rotates in one direction, pulling the rocker arm 23, via the connecting rods 22. The rotation of the rocker 23 causes the brake pads 24 to move toward the extended drum 25 or any surface on the wheel 7. As a result, the brake will apply to reduce the speed of the vehicle and bring it to stop.

Figure 6:
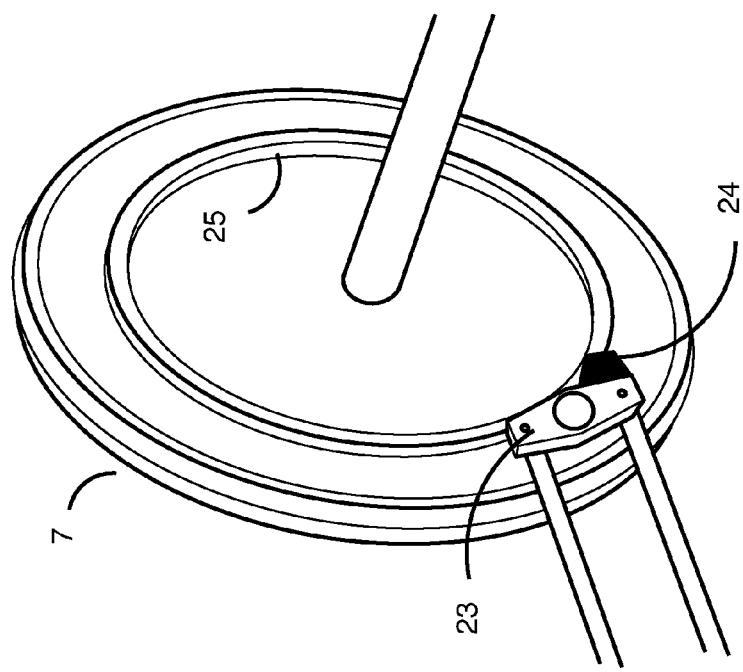
FIG. 6 is a close-up isometric view of the current invention showing the contacts between brake pads and wheel extended drums.
Figure 7:
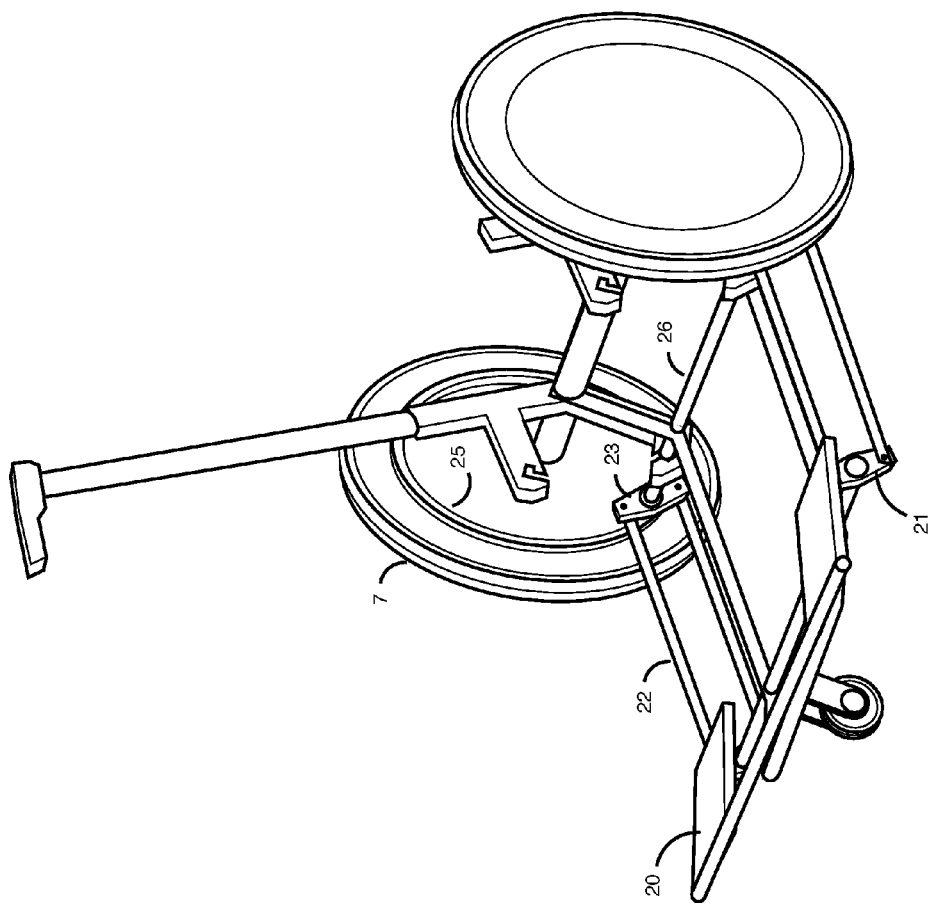
FIG. 7 is an isometric view of the current invention in braking condition.

FIGS. 6 and 7 show the isometric view of lever when it is in brake position as well as the contacts of brake pads with brake drum. FIG. 6 is the close-up isometric view of vehicle. In this illustration, the contact between the brake pad 24 with brake drum 25 is shown. It should be noted that any shape and material which will act as brake pads can be used.

Figure 8:
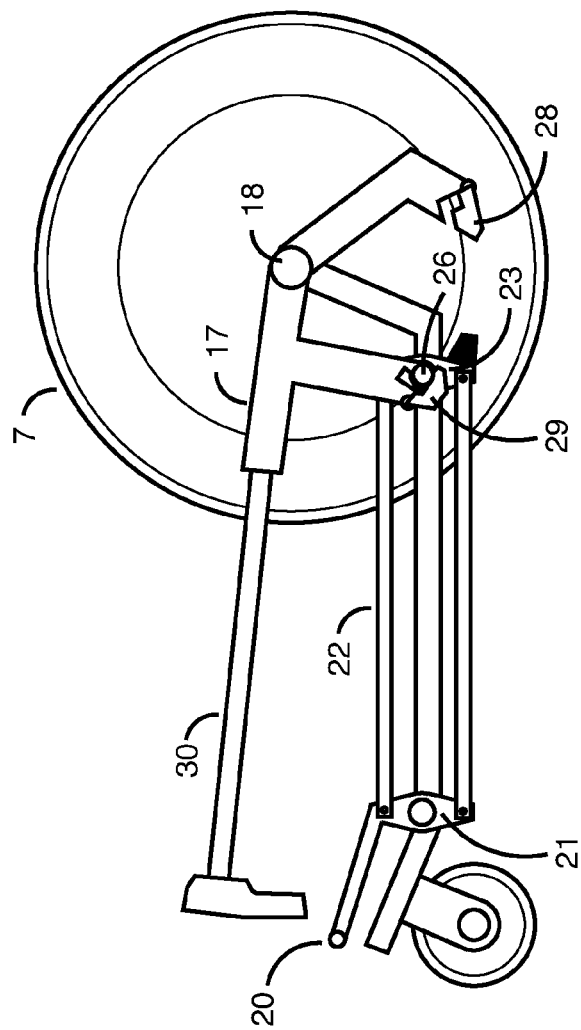
FIG. 8 is a side view illustration of the current invention with one of the rear wheels removed and when the vehicle is locked in fold position.
Figure 9:
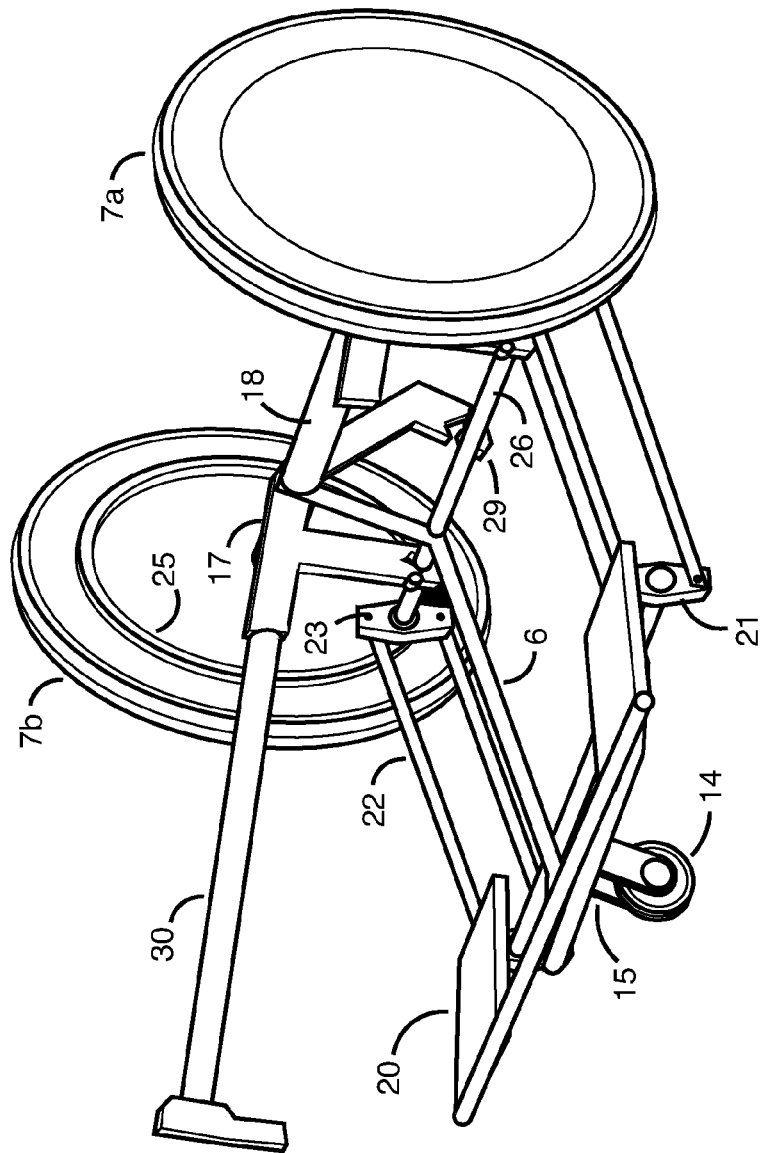
FIG. 9 is an isometric illustration of the present invention when the lever is locked in fold position.

FIG. 8 is the side view of the present invention, when the chassis is in folded position. The latch 29 is latched onto the latching axle. In order to release the vehicle and unfold it, the lever 20 should be pushed so that the cam 27 pushes the spring loaded latch 29. This will unlock the latch 29 from the latching axle 26. To complete the unfold process, the user has to rotate the moveable chassis 19 until the latching axle 26 reaches the latch arms at 28. The latch arms 28 then hold the vehicle in its extended position.

The present invention also includes a mechanism for driving a human powered foldable vehicle with the possibility of motor assistance. The possibility of adding a motor allows at least one wheel to be powered by the motor. The motor starts functioning only when the vehicle reaches a certain speed, and automatically disengages when the vehicle slows down below a certain speed.

Figure 10:
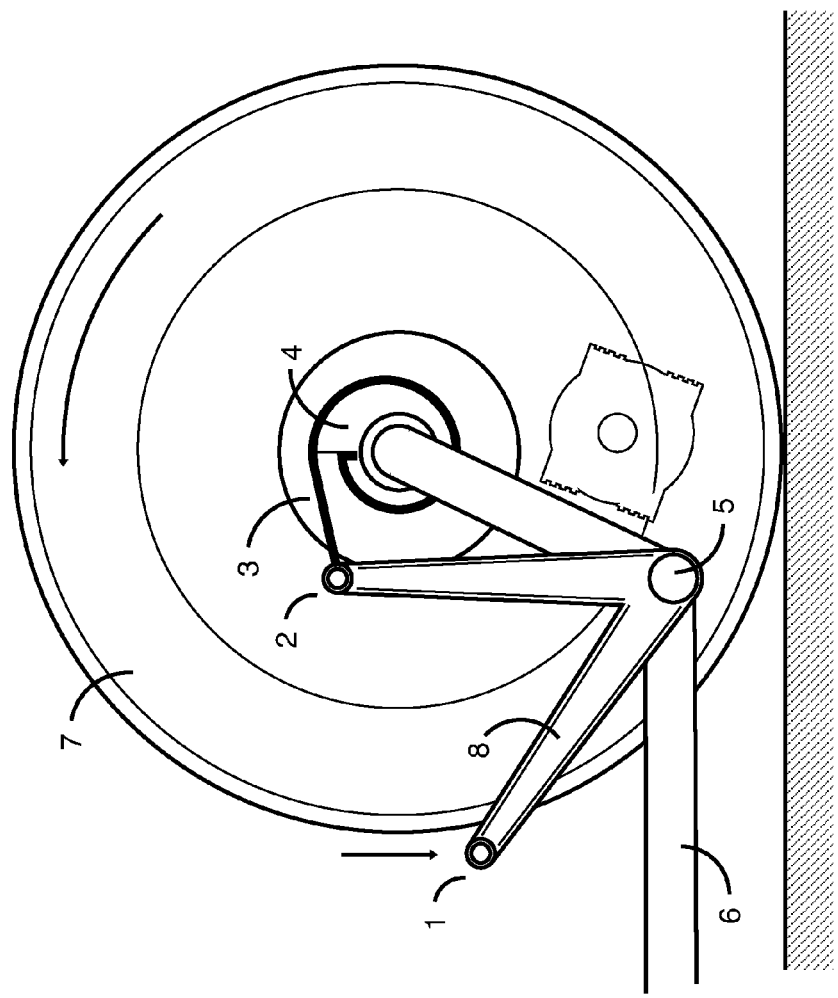
FIG. 10 is a side view illustration of one wheel of current invention when no force is applied on the pedal.

FIG. 10 illustrates the default state of the foldable vehicle when no force is applied on the pedal 1. The invention comprises of a cranking body 8, which is attached to the chassis 6 at pivot 5. When weight is applied on the pedal 1, the body 8 rotates around the pivot 5. This mechanism also comprises of a flexible cord 3 attached to the cranking body at point 2 which is wound around a spring loaded drum 4. The drum is spring loaded in such a way, that it keeps the cord wound around itself.

Figure 11:
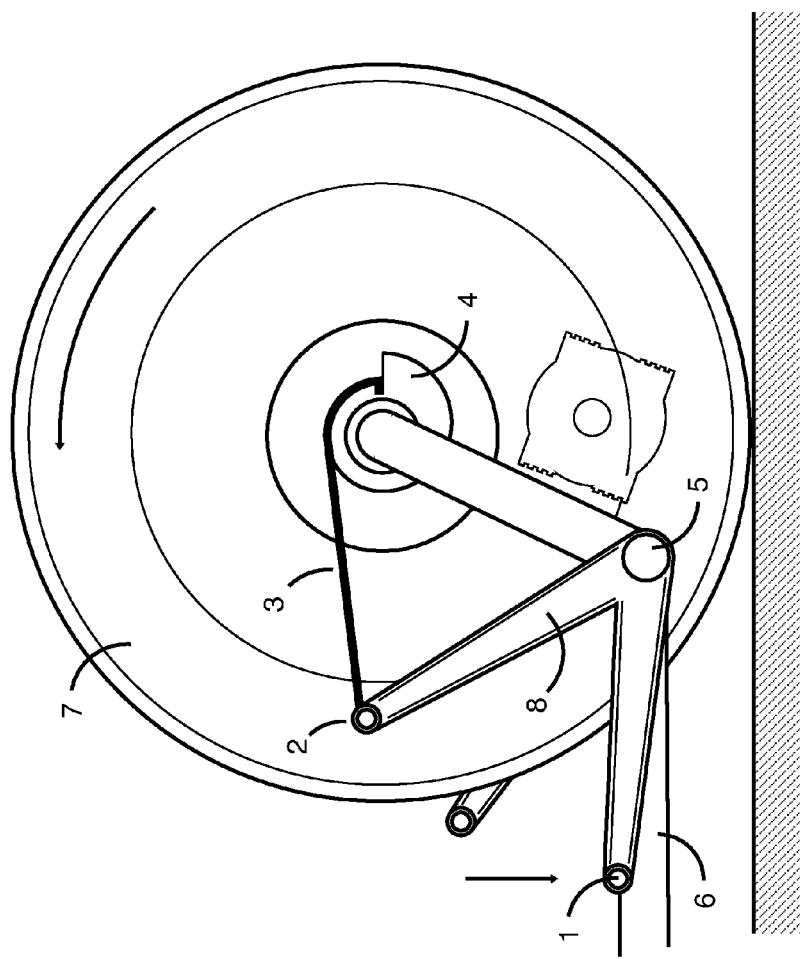
FIG. 11 is a side view illustration of one wheel of current invention when force is applied on the pedal.

FIG. 11 shows the mechanism when force is applied on the pedal 1. By applying force to pedal 1, the cranking body 8 starts to rotate which pulls the cord 3 and unwinds the drum 4. The drum 4 is attached to at least one wheel 7 via a directional freewheel clutch, such as one illustrated in FIG. 13. When the cord is pulled faster than the rotation of the wheel 7, the clutch engages and transmits the power to the wheel. Furthermore, when the force is lifted from the pedal 1, the drum begins to rewind, which returns the cranking body to its default position. The clutch allows the wheel 7 to move freely in the direction of motion while the drum is being rewound or it is in the idle state.

The present scooter has drive pedals 1 (one on each side), which are completely independent of each other. Each pedal 1 unwinding a spiral shaped drum 4, which in turn drives the wheel 7. The spiral is designed such that it has a larger unwinding radius at the start of the cranking stroke, thus providing greater torque in the beginning of the stroke. The radius gradually decreases as the cranking force gains momentum, allowing for greater speed at the end of the stroke. This can be compared to a low gear at the start and a continuously higher gear with gain in speed—without utilizing any gear mechanism.

The mechanism also gives the rider freedom to use one or both pedals at will. A free-wheeling mechanism is included, allowing uninterrupted motion of the vehicle when peddling is stopped. However for safety this mechanism does not allow the vehicle to roll back thus ensuring balance and confidence for the rider. On an incline the vehicle will roll forward without paddle assistance but will not roll backward on a reverse incline.

Figure 13:
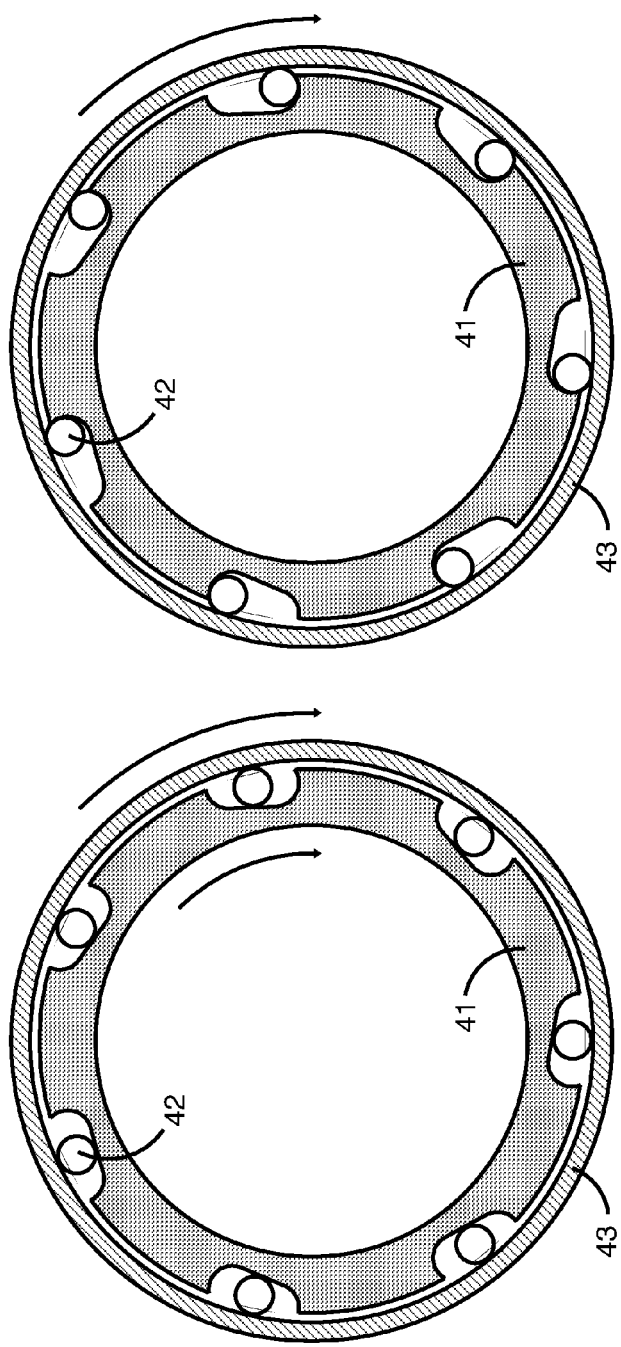
FIG. 13 illustrates the (a) clutched and (b) de clutched modes of the free clutch mechanism, where the driver wheel 41 drives the driven wheel 43 from inside, while allowing freewheeling of the drum.
Figure 16:
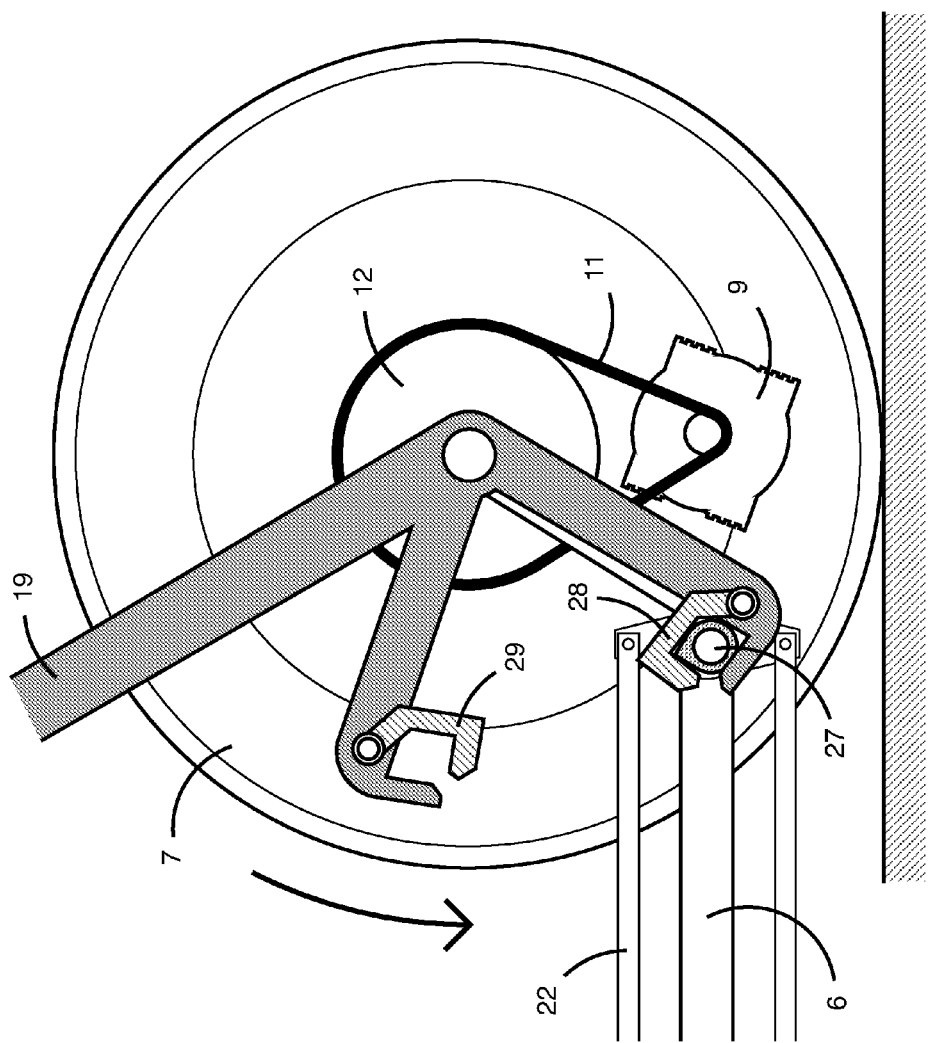
FIG. 16 illustrates a detailed side view of the chassis latching mechanism as the chassis being locked in open position.
Figure 17:
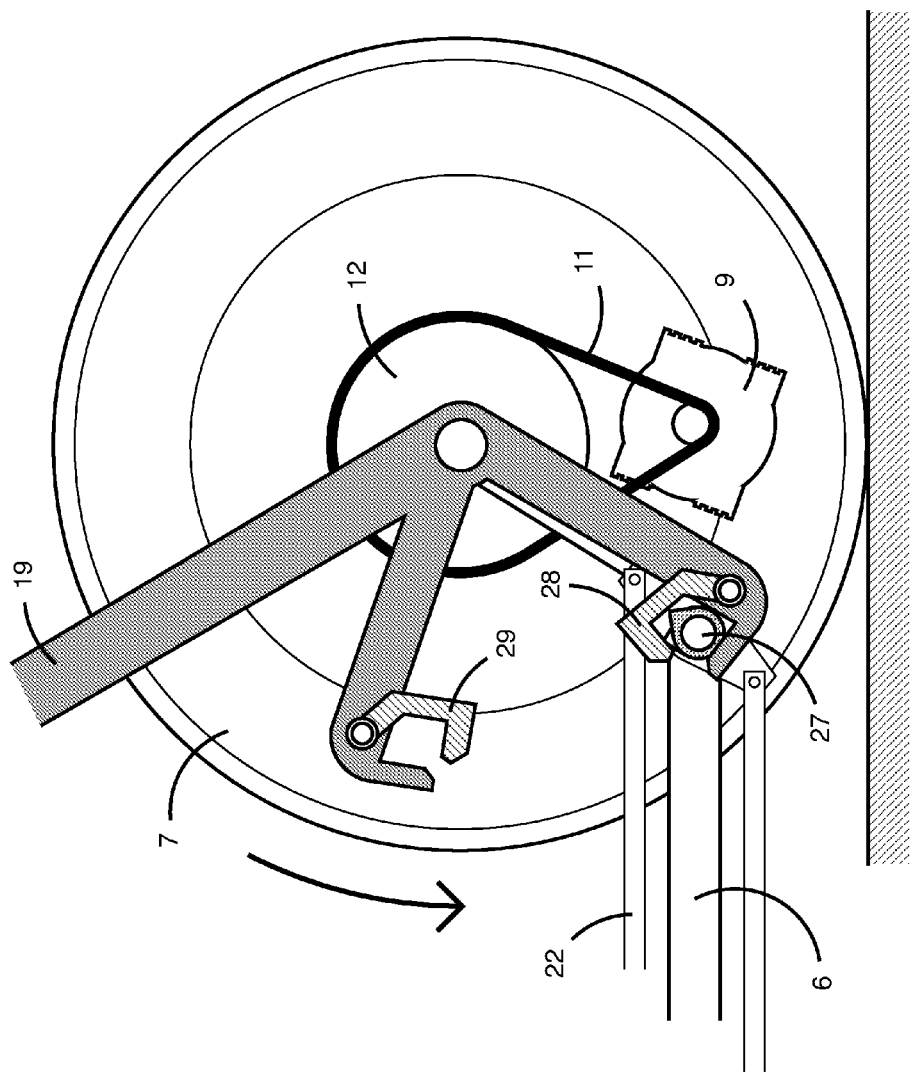
FIG. 17 illustrates a detailed side view of the chassis latching mechanism as the chassis being unlocked in open position.
Figure 18:
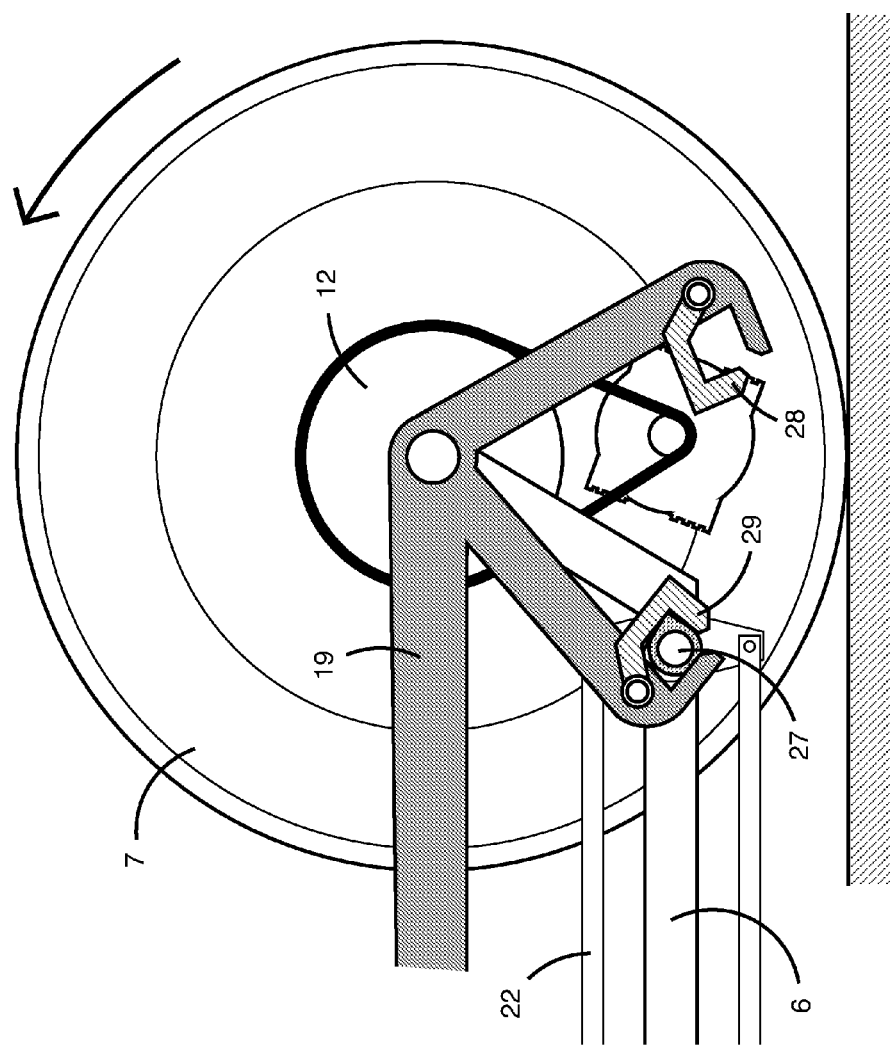
FIG. 18 illustrates a detailed side view of the chassis latching mechanism as the chassis being locked in closed position.
Figure 19:
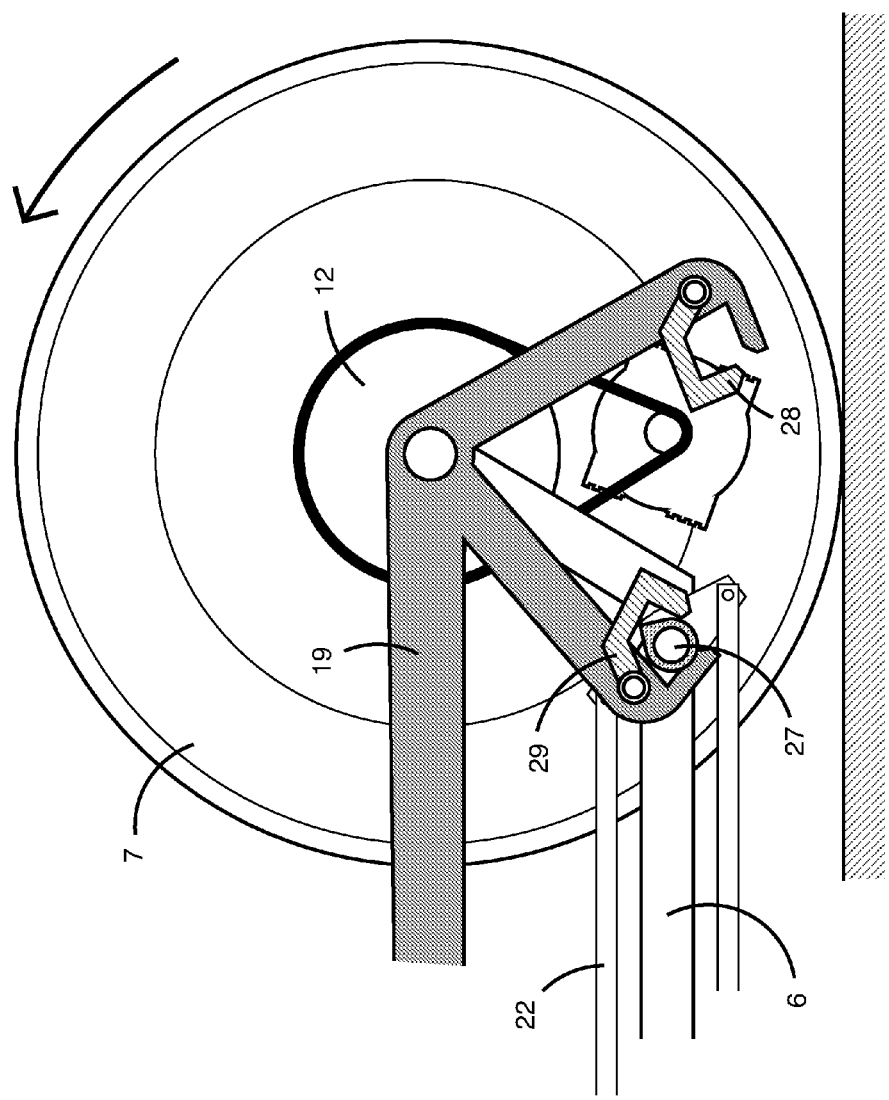
FIG. 19 illustrates a detailed side view of the chassis latching mechanism as the chassis being unlocked in closed position.

FIGS. 13 and 14 show variations of freewheel clutch with a driver wheel 41 containing rollers 42 and a driven drum 43. The driver 41 contains multiplicity of pockets shaped such that a roller 42 placed in each pocket wedges against its contours when driver 41 moves in the intended direction of motion (see FIGS. 13a and 14a). However, if the driven part 43 is moving faster than the driver 41 in the intended direction, the roller un-wedges and moves into a deeper part of the contoured pocket, allowing free motion of the driven part 43 with minimal resistance (see FIGS. 13b and 14b).

FIG. 15 illustrates (a) front and (b) side views of a free wheel clutch having both an internal driver 51 and an external driver 52 sandwiching a driven drum 53. All rotating parts, 51, 52, 53, are only connected to each other by an arrangement of bearings, such that power is transmitted between them only through a mechanism of freewheel clutches described above. The drivers have means (such as belts, gears or sprockets) to connect them to the power sources by the user of a drive mechanism. For instance, FIG. 15 illustrates surfaces 55 and 56 to receive belts. This arrangement assured that a driver only takes control of the motion of the drum 53 if it is moving faster, allowing the slower idle power source to be free of any load. This allows power to be seamlessly switched between two power sources.

In the present description, the use of "driven" and "driver" are for illustrative purposes only. In some applications, it may be desired to use the drum as a driver wheel when used in the reverse direction.

This type of clutch transfers power in one direction, such that when the driver part is idle or slower than the driven part, the driven part is free to move in the intended direction with minimal resistance. Said device allows more than one such drive mechanism to transfer power to the driven part independently. This allows more than one power source to simultaneously power a single vehicle without loading the system. In the scooter, the wheel 7 rotates freely in the intended direction of motion with the rotation of the motor without rotating the drum 12. This allows the motor to be at rest when not powered.

Steering is achieved by using a hand grip 30 conveniently located on one side. It can be placed on either side giving the option to switch from left to right hand, or both, which ever the rider favors for steering.

Figure 12:
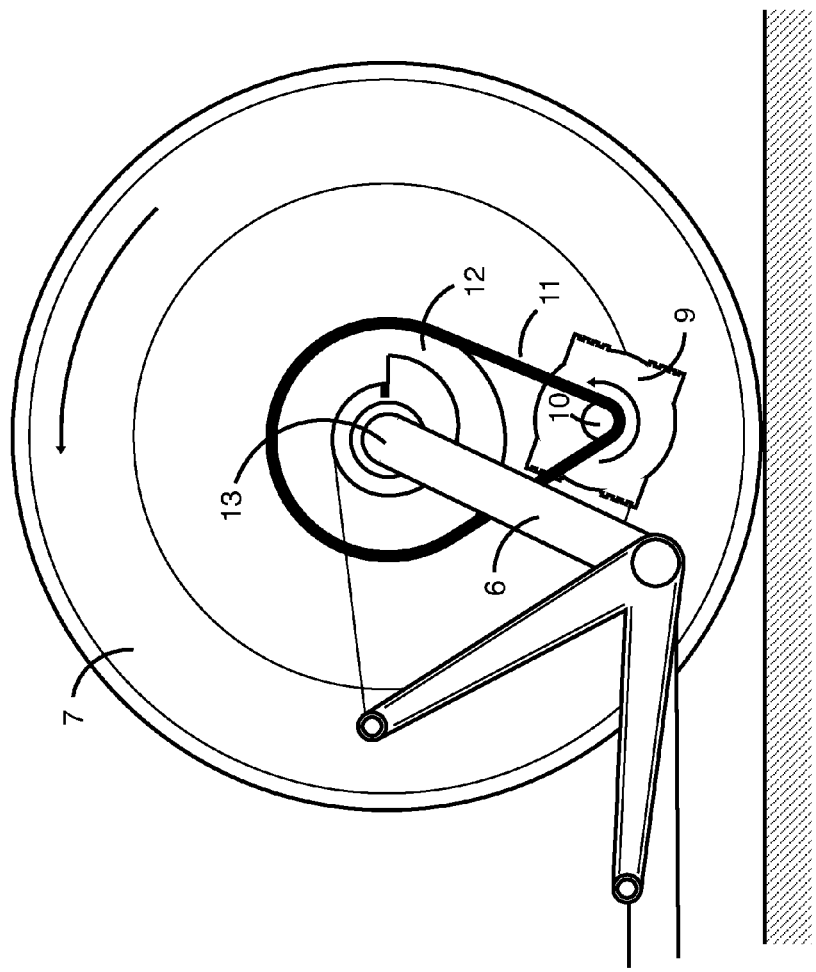
FIG. 12 is a side view illustration of one wheel of present invention which shows the motor powered mechanism.

FIG. 12 illustrates the motor powered mechanism for the present invention. The invention may include a motor 9 attached to the chassis 6. The rotating shaft 10 of the motor is connected to a drum 12 via a gear train, chain or belt 11, such that the drum 12 rotates with the motor. The drum 4 is attached to at least one wheel 7 of the vehicle through a directional freewheel clutch.

Motor assistance can be on at least one wheel once the vehicle has reached a certain speed. The design allows the installation of the electric assist motor without hindering the use of paddles. The rider may first pedal and achieve a certain speed when the electric assist motor will automatically cut in and takeover the drive. When the rider applies brakes and the vehicle slows down the electric assist motor will automatically cut out. This ensures that the rider does not need to flip or operate and switches in order for the electric assist motor to cut in or cut out. The assist motor has its own free wheeling clutch, therefore, when not in use it does not interfere with the pedal drive system. This ensures that when the motor is not in use and rider is pedaling away, the motor will be completely out of the way—automatically—because of the unique clutch mechanism, as illustrated in FIG. 13. This also ensures that the motor is completely isolated and does not spin when (a) the rider is using the pedals and (b) when the vehicle is being pulled by hand etc. This ensures zero friction and long life for all drive components involved.

The current invention may be embodied in other specific forms while maintaining its essential characteristics. The described embodiments provided in the document are illustrative, not restrictive. The claims below dictate the scope of the invention. All variations which are in nature within the range set forth by the claims are embraced within the scope of the invention.

What is claimed is:
1. A human powered vehicle, comprising:
  a. a chassis having a platform, a front side and a back side;
  b. two rear wheels connected to the back side of the chassis;
  c. a front wheel to steer the vehicle connected to the front side of the chassis;
  d. an axel connected to the back side of said chassis;
  e. at least one of said rear wheels being a powered wheel, wherein said powered wheel being connected to said axel through a freewheel clutch;

f. said freewheel clutch having a driver part and a driven part, wherein said powered wheel having means to connect to the driven part;
g. a cranking mechanism having means to connect to a windable drum;
h. said drum having means to connect to the driver part of the freewheel and being coaxially with said power wheel, whereby the freewheel clutch being located between said drum and said powered wheel to provide one-directional means;
i. a steering mechanism connected to the chassis to steer said front wheel;
j. a single lever mechanism connected to the chassis comprising:
  i. at least a latching and a locking arm rotatably connected to said chassis, to hold said vehicle in folded and unfolded positions, respectively;
  ii. at least a back and a front mechanically operated rocker arm, having an inner and an outer face and a center; said center pivotably connected to said chassis with a predetermined distance from said back side and said front side of the platform, respectively;
  iii. a lever connected to the top corner of at least one arm by means of fixed connectors;
  iv. at least a movement transferring connecting rod having a front side and a back side, said rocker arm connected to the back arm from said back side and to the front arm from said front side;
  v. at least a mating member connected to said center of the mechanically operated arm, said member locked in the latching and locking arm to hold the scooter in folded and unfolded positions; and
  vi. at least a brake pad connected to the mechanically operated arm to reduce the velocity of said scooter by touching said cylindrical drum, whereby the vehicle can be folded and braked by using a single lever.

2. The human powered vehicle of claim 1, wherein said cranking mechanism comprising:
a. a crank, having a pedal, connected to the chassis at a pivot point, whereby said crank rotates around the pivot point when forced by the pedal;
b. said crank also being connected to one end of a flexible cord;
c. the other end of the cord being connected to a spring loaded drum, whereby the drum tends to keep the cord wound around itself;
whereby, as the crank is rotated by a force or human power, it pulls the cord and unwinds the drum, and as the cord being pulled faster than the rotation of the wheel, the clutch engages and transmits the power to the wheel, and when the force is lifted from the pedal, the drum begins to rewind, which returns the cranking body to its default position, and the clutch allows the wheel to move freely in the direction of motion while the drum is being rewound or it is in the idle state.

3. The human powered vehicle of claim 1, wherein said cranking mechanism comprising:
a. a substantially V shaped crank having two sections and a corner;
b. said corner pivotably connected to the chassis;
c. one section having a pedal for cranking;
d. the second section connected to said drum through a cord with a predetermined length, wherein said cord wounded around said drum;
whereby said vehicle can be moved by pressing on the pedal.

4. The human powered vehicle of claim 1, wherein said drum being spiral, having a larger unwinding radius at the start of the cranking stroke, whereby providing greater torque in the beginning of the stroke, and having a gradually decreasing radius as the cranking force gains momentum, allowing for greater speed at the end of the stroke.

5. The human powered vehicle of claim 1, wherein said windable drum is spring-loaded for retraction.

6. The human powered vehicle of claim 5, wherein said spring being a torsional spring.

7. The human powered vehicle of claim 1, further comprising a motor assistance having means to connect to the freewheel clutch, wherein said clutch comprising an internal driver and an external driver sandwiching a driven drum; one driver having means to connect to the motor and the other driver having means to connect to the crank driven drum,
whereby said powered wheel rotates freely in the intended direction of motion with the rotation of the motor without rotating the drum, allowing the motor to be at rest when not powered.

8. The human powered vehicle of claim 7, wherein said connecting means are belts or gears or sprockets.

9. The human powered vehicle of claim 7, wherein said motor having means to start operating only when the vehicle reaches a predetermined speed, and automatically disengages when the vehicle slows down below the predetermined speed.

10. The human powered vehicle of claim 1, wherein said mechanically operated arm comprises a lozenge shape member.

11. The human powered vehicle of claim 1, wherein said single lever mechanism for folding and breaking comprising:
a. a lever (20) connected to a first rocker arm (21), located on the left or on the right side of the chassis;
b. said first rocker arm (21) connected to a second rocker arm (23) via one or more connecting rods (22);
c. said rod connected to the arms by a connecting means that allows the rod to rotate around its attachment point by a defined degree of freedom;
d. the second rocker arms (23) connected to, and rotates a braking and latching axle (26), wherein said axle connected to the chassis (6);
e. an axle (18) having multiplicity of latching arms with spring loaded latches (29), and multiplicity of holing arms (28);
f. latching arms having latches to hold the vehicle in expanded position by latching onto the latching axle (26) and holding arms having latches to hold the vehicle in fold position;
g. the latching axle including multiplicity of cams (27) that when rotated in the correct direction unlatch the latches;
whereby, to release the vehicle and unfold it, the lever (20) should be pushed so that the cam (27) pushes the spring loaded latch (29), unlocking the latch (29) from the latching axle (26).

12. The portable human powered vehicle of claim 11, wherein said steering mechanism comprising a column rotatably connected to the chassis; and a set of cables connecting said column to the steerable wheel, whereby the vehicle can be steered by rotating the column, which moves the cables and turns the steerable wheel.

13. The human powered vehicle of claim 12, wherein said column for steering the vehicle located on one side of the axle, and said column having a hand grip.

14. The human powered vehicle of claim 11, wherein the breaking mechanism comprising: a set of brake pads (24), connected to said first rocker arms (23); whereby when the brake pedal (20) being pushed, the rocker arm (21), rotates in one direction, pulling the rocker arm (23), via the connecting rods (22), and the rotation of the rocker (23) causes the brake pads (24) to move toward the wheel (7), applying the brake.

* * * * *